3,531,591
FILM TRANSPORT AND FILM POSITIONING DEVICE
Howard I. Jarmy, San Francisco, Calif., assignor to Singer-General Precision, Inc., Binghamton, N.Y., a corporation of Delaware
Filed Sept. 19, 1966, Ser. No. 580,336
Int. Cl. H04n 3/22
U.S. Cl. 178—7.7     3 Claims

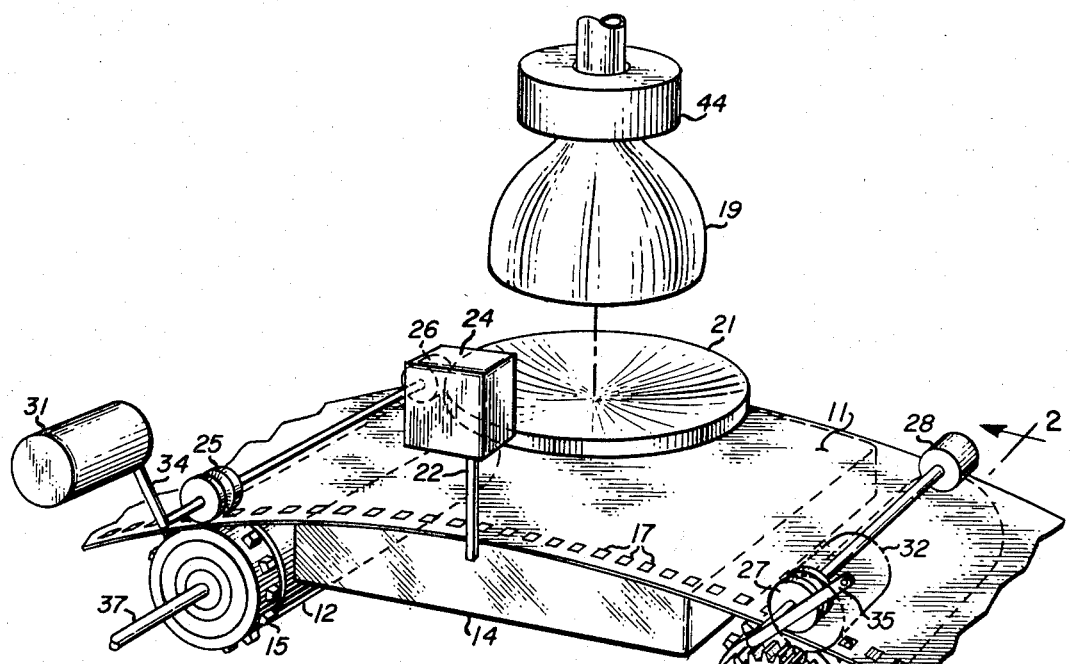
Fig_1
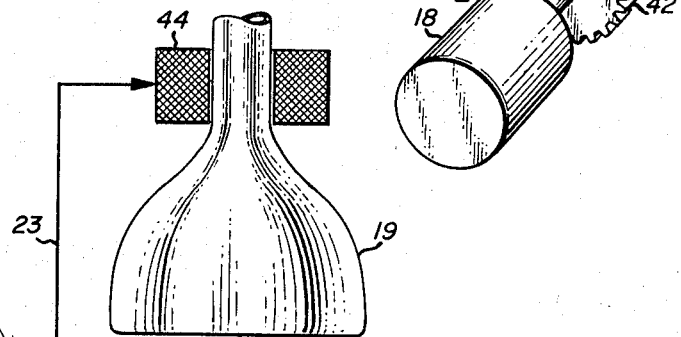
Fig_2
INVENTOR.
HOWARD I. JARMY
BY Edward A. Robinson
ATTORNEY United States Patent Office 3,531,591
Patented Sept. 29, 1970

ABSTRACT OF THE DISCLOSURE

The disclosed embodiment of the present invention is a film transport which includes a pair of capstan rollers for translating the film, a pair of sprockets associated with the capstan rollers for edge guiding the film, and a curved platen for supporting the film at a flying spot scanner station. An encoder is connected to one sprocket for sensing longitudinal movement of the film and a finger engages and senses the position of an edge of the film. A signal corresponding to the position of the edge of the film is supplied to the deflection circuitry of the flying spot scanner to alter to raster position thereof accordingly.

---

This invention relates to film transport systems, and more particularly to precision film drives which may be used with flying spot scanners or other optical systems for recording information on or reproducing information from a film strip.

It is an object of this invention to provide an improved precision film drive for supporting and moving a film strip in spaced relation with an optical system, and more particularly it is an object to provide a means for minimizing a tendency for the film strip to curl laterally in an optical station between supporting capstan rollers.

A further object of this invention is to rovide an improved film transport system using a platen with curvature longitudinal of the film strip to minimize the tendency for lateral curl in the film, and it is a further object to provide an optical system including the platen together with further optical means for correcting optical distortion which would result from the curvature of the platen.

It is a further object of the invention to provide an improved precision film transport wherein the film is perforated along at least one edge, and sprocket wheels are so positioned to engage the perforations to guide the film laterally, and more particularly it is an object to provide an encoder arrangement coupled to the sprocket wheels for generating a signal corresponding to the longitudinal positioning of the film strip.

Another object of this invention is to provide an improved precision film transport arrangement for use with a flying spot scanner which may optically record information onto and reproduce information from the film, and more particularly it is an object to provide a means for sensing the lateral positioning of the film and for generating a signal corresponding to the lateral film positioning for controlling the scanning position of the flying spot scanner raster or beam whereby a lateral displacement of the film may be compensated for by a corresponding lateral displacement of the film raster or beam scanning.

Numerous other objects and advantages will be apparent throughout the progress of the specification which follows. The accompanying drawing illustrates a certain exemplary embodiment of the invention, and the views therein are as follows:

FIG. 1 is a perspective view of the film drive arrangement and the flying spot scanner of this invention; and FIG. 2 is a vertical section along the plane 2—2 of FIG. 1.

Briefly stated, according to a preferred form of this invention, a film strip 11 moves across two spaced capstan rollers 12 and 13 which support and drive the film strip longitudinally. A platen 14 is positioned to support the film between the capstan rollers 12 and 13. The platen 14 may be of transparent quartz having an upper surface optically ground with a cylindrical curvature extending longitudinally of the film strip 11, such that the film strip 11 being drawn thereacross will assume a corresponding longitudinal curvature to minimize a tendency of the film to curl laterally across the strip. Two sprocket wheels 15 and 16 are positioned to rotate concentrically about the axes of the capstan rollers 12 and 13. The sprockets 15 and 16 are mounted to rotate freely of the capstan rollers 12 and 13 to engage perforations 17 along an edge of the film strip for guiding the film strip laterally. An encoding device 18 is mechanically coupled to one of the sprockets 16 and provides an electrical signal corresponding to the longitudinal position of the film strip. A cathode ray tube or flying spot scanner 19 is positioned above the platen 14 for optically scanning the film strip 11 thereon. The optical ssytem of the flying spot scanner 19 may include a lens 21 for optically focusing the flying spot from the scanner 19 upon the film strip 11, and for optically correcting for the longitudinal curvature of the platen 14. A feeler member or finger 22 engages an edge of the film strip 11 to sense the lateral positioning of the film strip and to provide a signal corresponding to the lateral positioning. By a circuit means 23, the lateral displacement signal is passed to deflection circuitry of the flying spot scanner 19 to control the lateral positioning of the scanning raster or beam, whereby a lateral displacement of the film strip 11 will be compensated for by a similar displacement of the optical scanning raster or beam from the flying spot scanner 19.

As shown in FIG. 1, the film strip 11 moves across a first of the capstan rollers 12, across the transparent platen 14, and thence across a second of the capstan rollers 13. The film strip 11 may be wound about reels (not shown) on each side of the capstan rollers 12 and 13. Associated with each capstan is a pair of pinch rollers 25-26 and 27-28, which are urged downwardly to frictionally engage the edges of the film strip 11 against the sprocket wheels 15 and 16 and edges of the capstan rollers 12 and 13. Two solenoids 31 and 32 are mechanically coupled by means such as crank arms 34 and 35 for exerting forces urging the pinch rollers downwardly against the edges of the film 11 and the sprocket wheels 15 and 16 and capstans 12 and 13. More particularly, rollers 26 and 28 pinch the film against capstans 12 and 13 respectively and rollers 25 and 27 pinch the film against sprockets 15 and 16. As shown in FIGS. 1 and 2, the pinch rollers 25 and 27 may be formed with a circumferential groove for receiving the teeth from the sprocket wheels 15 and 16 without interference. A photographic emulsion or coating is applied to the upper side of the film 11, and since the pinch rollers 25-26 and 27-28 contact the film only at the edges, the main central area of the film will not be damaged by contact with the rollers. Obviously, the information stored by the film strip will be in the central area away from the edges, and therefore will not come in mechanical contact with the pinch rollers or any other structure.

As indicated heretofore, the capstans 12 and 13 will provide the drive for the film strip 11 past the optical station. The capstan rollers may be driven in either direction, and therefore the film strip 11 may move either to the right or to the left as shown in FIG. 1. The rollers 12 and 13 may be mounted on drive shafts 37 and 38 which will supply mechanical energy thereto. The pair of sprockets 15 and 16 are loosely mounted concentrically on the shafts 37 and 38 such that the axes of rotation of the sprockets are the same as the axes of rotation of the shafts and capstan rollers, but the sprocket rotation is in each case independent of the rotation of the capstan. It will therefore be appreciated that the rotation of the sprockets 15 and 16 will correspond to the longitudinal movement of the film strip 11 regardless of the fact that there may be slippage between the capstans 12–13 and the film strip 11.

A principal function of the sprockets 15 and 16 is to guide the film laterally, since sprocket teeth engage the perforations 17. Another function of the sprocket wheel 16 is to provide an indication of the longitudinal position of the film as shown in FIGS. 1 and 2, a pair of gears 41 and 42 providing a mechanical coupling between the sprocket wheel 16 and encoder device 18. As the film moves longitudinally, the sprocket 16 rotates therewith, and the rotation is transferred to the encoder which may be a form of commutator and counter wherein commutator segments are counted as the sprocket 16 rotates to generate an indication of the longitudinal positioning of the film 11. The commutator arrangement of the encoder 18 may include conductive brushes contacting electrically conductive segments; or it may include an optical pickup device such as a photomultiplier sensitive to magnetic spots or segments which move past the transducer. The particular form of encoder 18 is not important to this invention since any conventional commutator or encoder would be satisfactory.

The platen 14 is preferably a transparent optical element such as quartz wherein the surface may be ground with optical precision. The upper surface, which engages and supports the film, is ground with a radius of curvature extending longitudinally in the direction of the film. In an exemplary embodiment of this invention, the platen had a radius of curvature of 416 inches. As the film 11 is drawn thereacross, the film must assume a corresponding radius of curvature against the platen, and therefore a tendency for the film to curl laterally will be minimized. In the exemplary embodiment of this invention, the film strip 11 was 14 inches wide, and a film strip of such width did exhibit a great tendency to curl laterally. Since the pinch rollers 25–26 and 27–28 hold the edges of the film securely against the capstan rollers 12 and 13, the tendency for the film to curl is considerably reduced. However, it was found that, regardless of the pinch rollers, the film would ordinarily curl laterally in the area between the capstans to introduce inaccuracies in the optical system. The use of the cylindrically ground platen 14 proved satisfactory in eliminating nearly all of the curl of the film at the optical station. The film may curl slightly at the edges thereof even with the use of the platen 14, but no important information is recorded near the edges of the film, and the slight edge curl is of no consequence.

As shown in FIGS. 1 and 2, a lens 21 is optically ground to focus from the scanner 19 upon the film 11, and to compensate for the curvature of the platen and of the film resting thereon. The flying spot scanner may be used as shown for recording information upon unexposed film, or alternatively, the flying spot scanner may reproduce information from photographically processed film. If it is desired to reproduce information, the flying spot of light generated by the scanner 19 is focused upon the film by the optical means 21 and thence the spot passes through the film 11 and the transparent platen 14 to an optical-electrical transducer such as a photomultplier (not shown). An alternative to this structure would be to place the flying spot scanner 19 below the platen 14 such that the spot of light would pass upwardly through the platen and the film. In this case, the optical correction for the cylindrical upper surface of the platen 14 might possibly be made by a compensating optically ground lower surface.

As indicated heretofore, this invention provides a scanner and a film transport for a wide film strip 11. In addition to a tendency for the film to curl at the optical station, the film is not geometrically perfect and tends to stretch or distort from one edge to the other. The sprocket wheels 15 and 16 guide the film laterally by means of the sprocket teeth which engages the perforations 17. However, it has been found to be impossible to prevent some lateral shifting of the film as it passes through the optical station. Indeed, the film may shift laterally as much as $\frac{1}{16}$ inch even though guided by the sprocket wheels 15 and 16. This lateral shifting would be intolerable in an ordinarily film transport system where it is desired to scan the film with an accuracy up to .001 inch. This invention compensates for the lateral shifting by providing a movable or feeler member 22 which engages an edge of the film midway between capstans 12 and 13 at the optical station. As the film strip 11 moves past the optical station, the finger member 22 senses the lateral positioning thereof. The feeler member may be coupled to an electrical device such as a potentiometer or a linear variable differential transformer, LVDT, 24 for providing an electrical signal which corresponds with the movement of the feeler member 22 and the lateral displacement of the film strip 11.

The electrical signal generated by the LVDT is passed by circuit means shown schematically by the lead 23, in FIG. 2, to the deflection circuitry and deflection yoke 44. The electrical signal passing through the deflection yoke 44 will deflect an electron beam within the flying spot scanner to effectively shift the scanning thereof in a lateral direction with respect to the film strip 11 to compensate for the lateral displacement thereof. Therefore, the scanning of the flying spot scanner 19 will move laterally as the film strip 11 moves laterally to thereby maintain the accuracy of scanning. In the exemplary embodiment of this invention, the final accuracy of scanning has been held to .001 inch, even though the film strip 11 was observed to shift laterally much more than this amount.

From the foregoing, it may be appreciated that this invention will provide a high degree of scanning accuracy upon a film strip which is moved by this precision transport. Prior to this invention, it was not possible to scan a wide film (up to 14 inches) with any degree of precision due to the tendency to curl laterally and due to physical shift laterally within the optical station. This invention permits the high degree of accuracy even though the film has a tendency to curl and to move laterally.

Changes may be made in the form, construction, and arrangement of the parts without departing from the spirit of the invention or sacrificing any of its advantages, and the right is hereby reserved to make all such changes as fall fairly within the scope of the following claims.

The invention is claimed as follows:

1. A film transport system comprising means for supporting and driving a film strip in a longitudinal direction, a scanning means positioned to optically scan the film strip, means for sensing lateral movement of the film strip, and circuit means coupled between the scanning means and the lateral movement sensing means, said circuit means being operable to control the scanning means in accordance with the lateral movement of the film strip.

2. A film transport system comprising two spaced apart capstans for supporting and driving a film strip, a scanning means, optical means associated with the scanning means and with the film strip whereby the film strip is scanned by the scanned means, feeler means positioned to sense an edge of the film strip for determining lateral positioning of the film strip, and circuit means controllably coupled between the scanning means and the feeler means whereby the scanning of the film strip is adjusted in accordance with the lateral positioning thereof.

3. A film transport system comprising two spaced apart capstan rollers for supporting and driving a film strip, a transparent platen positioned to engage and support the film between the capstan rollers, said platen having a convex cylindrical surface against the film strip, the surface of the platen having a curvature longitudinally with respect to the film strip to reduce a tendency for the film to curl laterally across the strip, two sprocket wheels mounted to rotate concentrically with respect to the capstan rollers and positioned to engage perforation holes along an edge of the film strip for guiding the film strip laterally, said sprocket wheels being mounted to rotate freely and independent of the rotation of the capstan rollers, an encoding means mechanically coupled to one of the sprocket wheels for providing a signal indicative of the longitudinal positioning of the film strip, a flying spot scanner for scanning the film strip, optical means associated with the flying spot scanner and with the film strip for optically focusing the flying spot scanner upon the film strip, said optical means including means for optically correcting for the cylindrical curvature of the platen and of the film strip supported thereon, a feeler means having a finger engaging and sensing the lateral positioning of an edge of the film strip, said feeler means being operable to generate a signal corresponding to the lateral positioning of the film strip, and circuit means electrically coupled to the feeler means and to the flying spot scanner for controlling a lateral positioning of the film scanning in accordance with the lateral positioning sensed by the feeler means.

References Cited

UNITED STATES PATENTS

| | | | |
|---|---|---|---|
| 2,479,553 | 8/1949 | Boecking | 352—228 |
| 2,569,280 | 9/1951 | Bedford | 178—7.6 |
| 2,718,549 | 9/1955 | Matke | 178—7.4 |
| 2,839,602 | 6/1958 | Fries | 178—6.7 |

RICHARD MURRAY, Primary Examiner

R. K. ECKERT, JR., Assistant Examiner

U.S. Cl. X.R.

178—7.2; 226—76